Patented Aug. 3, 1954

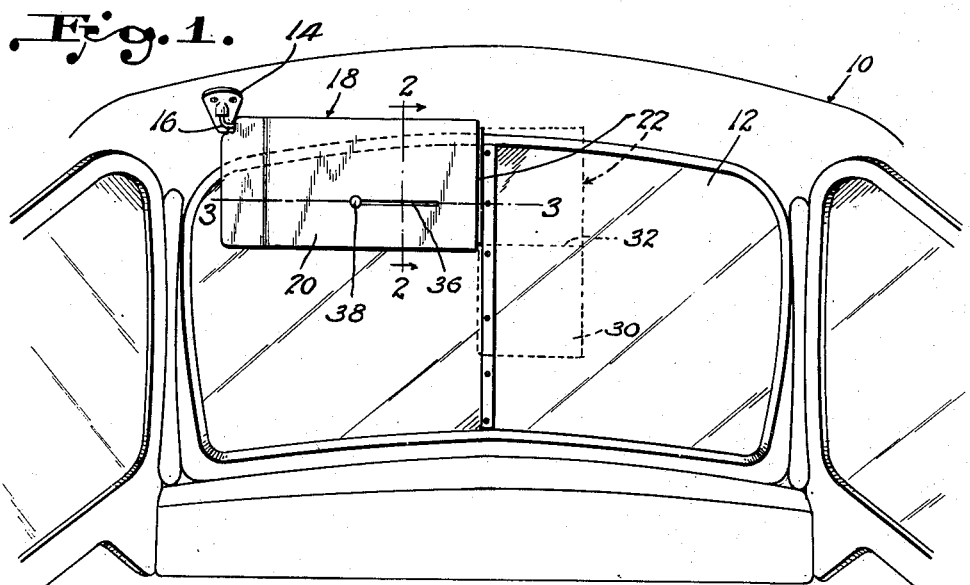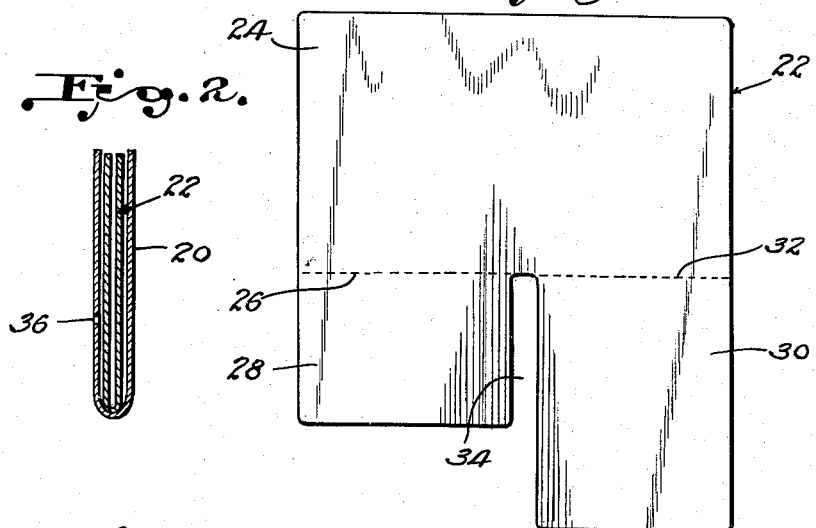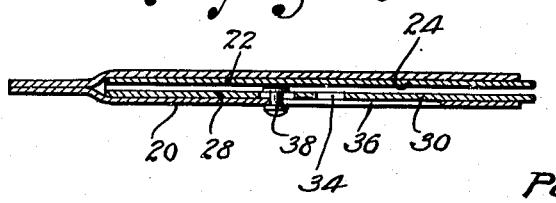

2,685,336

UNITED STATES PATENT OFFICE 2,685,336

SUN VISOR

Patrick J. Menighan, Wilkes-Barre, Pa.

Application June 4, 1952, Serial No. 291,625

3 Claims. (Cl. 160—33)

This invention relates to a sun visor and more particularly to a sun visor of the type employed on the interior of a motor driven vehicle.

The primary object of the invention is to shield the eyes of the driver of a motor driven vehicle from the glare of the sun, particularly when it is low on the horizon.

Sun visors of the type to which this invention relates are generally secured above the windshield of a vehicle for movement from a substantially horizontal position in which it is inactive, to a downwardly extending position in which the visor serves to obscure a portion of the windshield and shield the eyes of the user from the glare of the sun. While such visors serve admirably, they are generally so mounted that there is an unprotected space about midway between opposite ends of the windshield and when the vehicle is being driven in certain directions with the sun low on the horizon, a great deal of interference is experienced with the vision of the driver due to the glare of the sun rays in his eyes.

Another object of this invention is to enable the rays of the sun to be blocked out of the vision of the operator of the vehicle even though they may attempt to penetrate the space between the two visors commonly carried by the vehicle.

The above and other objects may be attained by employing this invention which embodies among its features an elongated relatively wide flat tubular shield mounted adjacent one longitudinal side edge on a motor vehicle for movement within the vehicle about a substantially horizontal axis which extends transversely of the vehicle adjacent the windshield thereof, an auxiliary elongated shield mounted within the tubular shield for movement longitudinally through one end thereof, and a flap hingedly carried by one longitudinal side edge of the auxiliary shield adjacent one end thereof for movement downwardly adjacent the tubular shield member when the auxiliary shield member moves outwardly through the end of the tubular shield.

In the drawings,

Fig. 1 is a fragmentary view of the forward end of the interior of a motor vehicle showing this improved sun visor in place behind the windshield of the vehicle, Fig. 2 is an enlarged fragmentary sectional view taken substantially on the line 2—2 of Fig. 1, Fig. 3 is an enlarged fragmentary horizontal sectional view taken substantially on the line 3—3 of Fig. 1, and Fig. 4 is a plan view of the auxiliary shield employed in connection with this invention.

Referring to the drawings in detail a motor vehicle 10 is equipped with a conventional windshield 12 and mounted on a suitable bracket 14 for swinging movement in a substantially horizontal arcuate path is a supporting arm 16 on which this improved sun visor designated generally 18 is mounted for movement about the longitudinal axis of the supporting arm 16. The structure so far described is conventional and forms no part of this invention which is solely contained within the visor 18 above mentioned. The visor 18 above referred to comprises a relatively flat tubular body 20 of elongated rectangular form which is open at the end remote from that adjacent the bracket 14, and mounted for longitudinal sliding movement within the body 20 is an auxiliary shield member designated generally 22. This shield member comprises an elongated rectangular body 24 having joined thereto adjacent one end along a longitudinally extending fold line 26 a guide flap 28. A shield flap 30 joins the body 24 along a fold line 32 adjacent the opposite end of the body 24 and the shield flap 30 is separated from the flap 28 by a space 34. The body 20 of the shield 18 is provided on the side thereof remote from the windshield 12 with an elongated longitudinal slot 36, and carried by the flap 28 of the body 24 is a rivet 38, the shank of which extends through the slot 36 to provide a handle by means of which the shield member 22 may be moved longitudinally with relation to the shield 18.

With the parts assembled as illustrated in Figs. 1 through 3 inclusive, and the shield member 22 moved to its fullest extent within the tubular shield 18, the parts will be as illustrated in Fig. 1. When the sun's rays are apt to interfere with the driver of the vehicle, the shield 18 is turned downwardly as shown in Fig. 1 and the shield member 22 is moved longitudinally as suggested in the dotted lines in Fig. 1 so that the shield flap 30 will swing downwardly to cover a portion of the windshield to one side of the driver of the vehicle so as to prevent the glare of the sun's rays from interfering with his vision.

While in the foregoing there has been shown and described the preferred embodiment of this invention it is to be understood that minor changes in the details of construction combination and arrangement of parts may be resorted

What is claimed is:

1. A sun visor for shading the eyes of the operator of a motor vehicle, an elongated relatively wide flat tubular shield mounted adjacent one longitudinal side edge on a motor vehicle for movement within the vehicle about a substantially horizontal axis which extends transversely of the vehicle adjacent the windshield thereof, an auxiliary elongated shield mounted within the tubular shield for movement longitudinally through one end thereof, a flap hingedly carried by one longitudinal side edge of the auxiliary shield adjacent one end thereof for movement downwardly adjacent the tubular shield member when the auxiliary shield member moves outwardly through the end of the tubular shield, said tubular shield having an elongated longitudinal slot extending therethrough intermediate the ends thereof, an extension carried by and extending parallel with the auxiliary shield within the tubular shield, and a knob carried by the extension and extending through the slot for moving the auxiliary shield within the tubular shield and engaging opposite ends of the slot for limiting such movement of said auxiliary shield.

2. A sun visor for shading the eyes of the operator of a motor vehicle including an elongated relatively wide flat tubular shield mounted adjacent one longitudinal side edge of a motor vehicle for movement within the vehicle about a substantially horizontal axis which extends transversely of the vehicle adjacent the windshield thereof, an auxiliary elongated shield mounted within the tubular shield for movement longitudinally through one end thereof, a flap hingedly carried by one longitudinal side edge of the auxiliary shield adjacent one end thereof for movement downwardly adjacent the tubular shield member when the auxiliary shield member is moved outwardly through the end of the tubular shield, said tubular shield having an elongated longitudinal slot extending therethrough intermediate the ends thereof, a knob connected to said auxiliary shield within the tubular shield, the connecting means between the knob and the auxiliary shield engaging opposite ends of the slot for limiting the longitudinal sliding movement of the auxiliary shield.

3. A sun visor for shading the eyes of the operator of a motor vehicle including an elongated relatively wide flat tubular shield mounted adjacent one longitudinal side edge of the motor vehicle for movement within the vehicle about a substantially horizontal axis which extends transversely of the vehicle adjacent the windshield thereof, an auxiliary elongated shield mounted within the tubular shield for movement longitudinally through one end thereof, a flap hingedly carried by one longitudinal side edge of the auxiliary shield adjacent one end thereof for movement downwardly adjacent the tubular shield member when the auxiliary shield member is moved outwardly through the end of the tubular shield, said tubular shield having an elongated longitudinal slot therethrough intermediate the ends thereof, a rivet carried by said auxiliary shield and extending through said longitudinal slot, and a knob on said rivet outwardly of said tubular shield for moving the auxiliary shield within the tubular shield and engaging opposite ends of the slot for limiting such movement of said auxiliary shield.

References Cited in the file of this patent

UNITED STATES PATENTS

| Number | Name | Date |
|---|---|---|
| 2,201,197 | Minor, Jr. | May 21, 1940 |
| 2,257,612 | Lininger | Sept. 30, 1941 |
| 2,385,557 | Ward | Sept. 25, 1945 |
| 2,498,966 | Sauer | Feb. 28, 1950 |
| 2,603,530 | Jones | July 15, 1952 |